(12) United States Patent
Lee

(10) Patent No.: US 6,834,818 B2
(45) Date of Patent: Dec. 28, 2004

(54) FOOD PROCESSOR BLADE UNIT

(76) Inventor: Ming-Tsung Lee, P.O. Box 90, Tainan City (TW)

(*) Notice: Subject to any disclaimer, the term of this patent is extended or adjusted under 35 U.S.C. 154(b) by 105 days.

(21) Appl. No.: 10/414,212

(22) Filed: Apr. 16, 2003

(65) Prior Publication Data
US 2004/0206837 A1 Oct. 21, 2004

(51) Int. Cl.[7] .............................................. A47J 43/046
(52) U.S. Cl. ........................ 241/292.1; 99/205; 99/314; 241/282.2
(58) Field of Search ........................... 241/292.1, 282.1, 241/282.2; 99/314, 205

(56) References Cited

U.S. PATENT DOCUMENTS 2,771,111 A * 11/1956 Seyfried ................... 241/292.1
3,785,579 A * 1/1974 Voglesonger ............ 241/282.1
4,101,082 A * 7/1978 Mayer et al. ............ 241/282.1
4,272,031 A * 6/1981 Jines ........................ 241/46.17
6,092,922 A * 7/2000 Kett et al. .................. 366/205

* cited by examiner

Primary Examiner—Mark Rosenbaum

(57) ABSTRACT

A food processor blade unit includes an upper blade and a lower blade and a shaft. The upper blade has two side sections respectively divided into a first stage, a second stage and a third stage all angled differently. The lower blade has two side sections divided into a level section and a sloped section with a bending-down end section. Both the upper and the lower blade further respectively have one lengthwise side formed with a blade edge. Then the three stages of the upper blade can cut food into minute bits, and the level section and the sloped section of the lower blade can cut, stir and churn cut food repeatedly again and again into juice, minute bits or powder.

3 Claims, 5 Drawing Sheets

FOOD PROCESSOR BLADE UNIT

BACKGROUND OF THE INVENTION

1. Field of the Invention

This invention relates to a food processor blade, particularly to one possible to cut, stir and churn vegetables, fruits, etc. into juice or nuts such as coffee beans, peanut, etc. into very minute bits or powder.

2. Description of the Prior Art

A common conventional food processor 1 shown in FIG. 1 includes a container 10 with an upper opening, a blade 11 fixed on a bottom of the container 10, a base 12 provided under the container 10 with a motor, a related electric circuit, etc. arranged therein. Then the blade 11 is rotated to cut stir and churn food put in the container 10 into juice, minute bits or powder. The conventional food processor has its blade ends 11 bending upward and curving down for cutting, stirring and churning vegetables or fruits into juice or minute bits, but its stirring or churning action is not complete as to leave comparative much big residue. If food is cut, stirred and churned for a long time, the vitamins in the food may be lost. As to hard nuts, they can only be cut into comparatively big particles, needing other grinding appliances to grind into minute particles or powder before they can be boiled or cooked.

SUMMARY OF THE INVENTION

This invention has been devised to offer a food processor blade unit for cutting, stirring, and churning vegetables and fruits into juice, or nuts such as coffee beans, peanuts, etc. into minute bits or powder.

The feature of the invention is a blade unit consisting of an upper blade and a lower blade fixed on a shaft. The upper blade has two side sections respectively bending upward, and each section divided into a first stage, a second stage and a third stage all differently angled, and the lower blade has two side sections of a first level section and a second sloped section with an end section.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
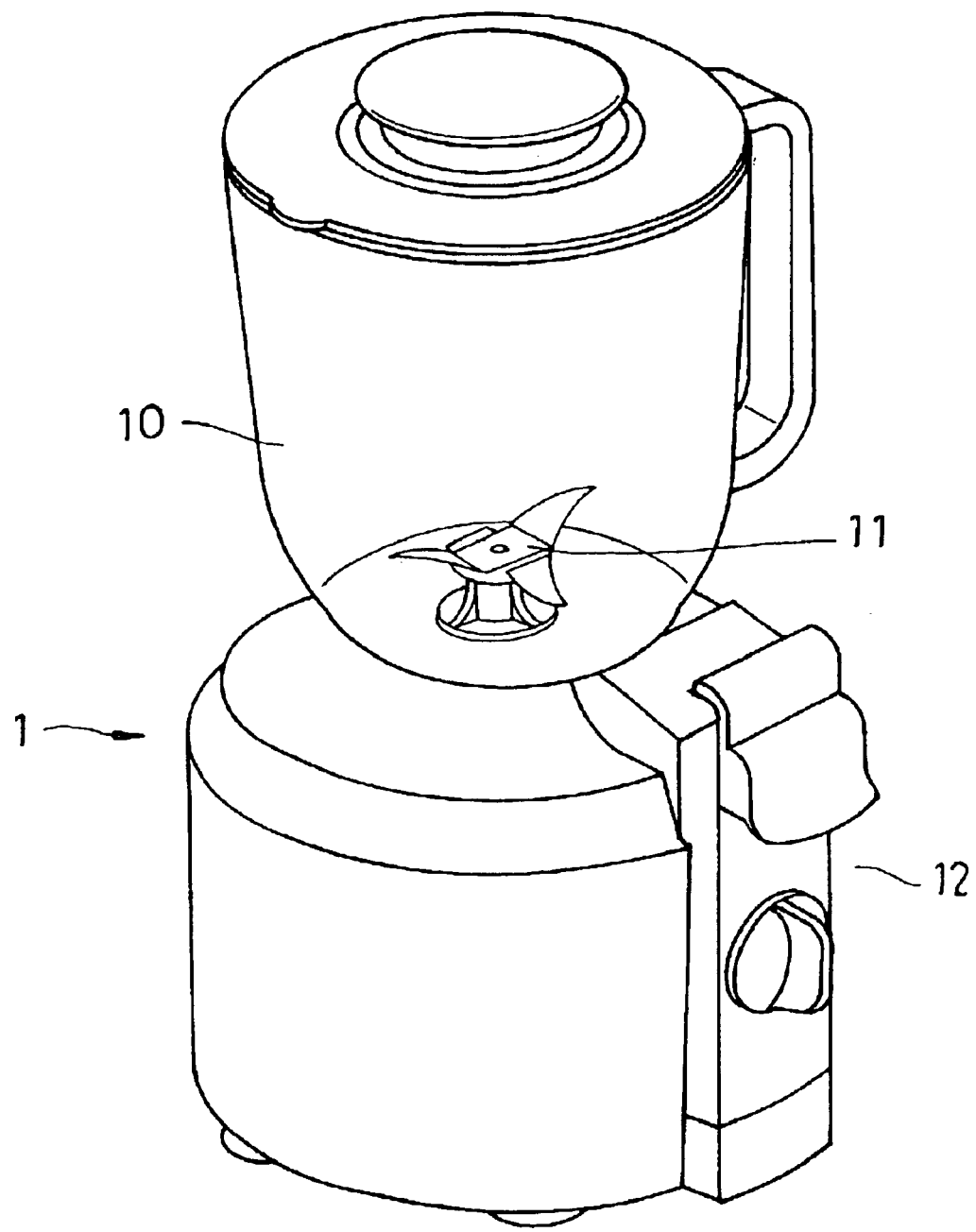
FIG. 1 is a perspective view of a common conventional food processor.
Figure 2:
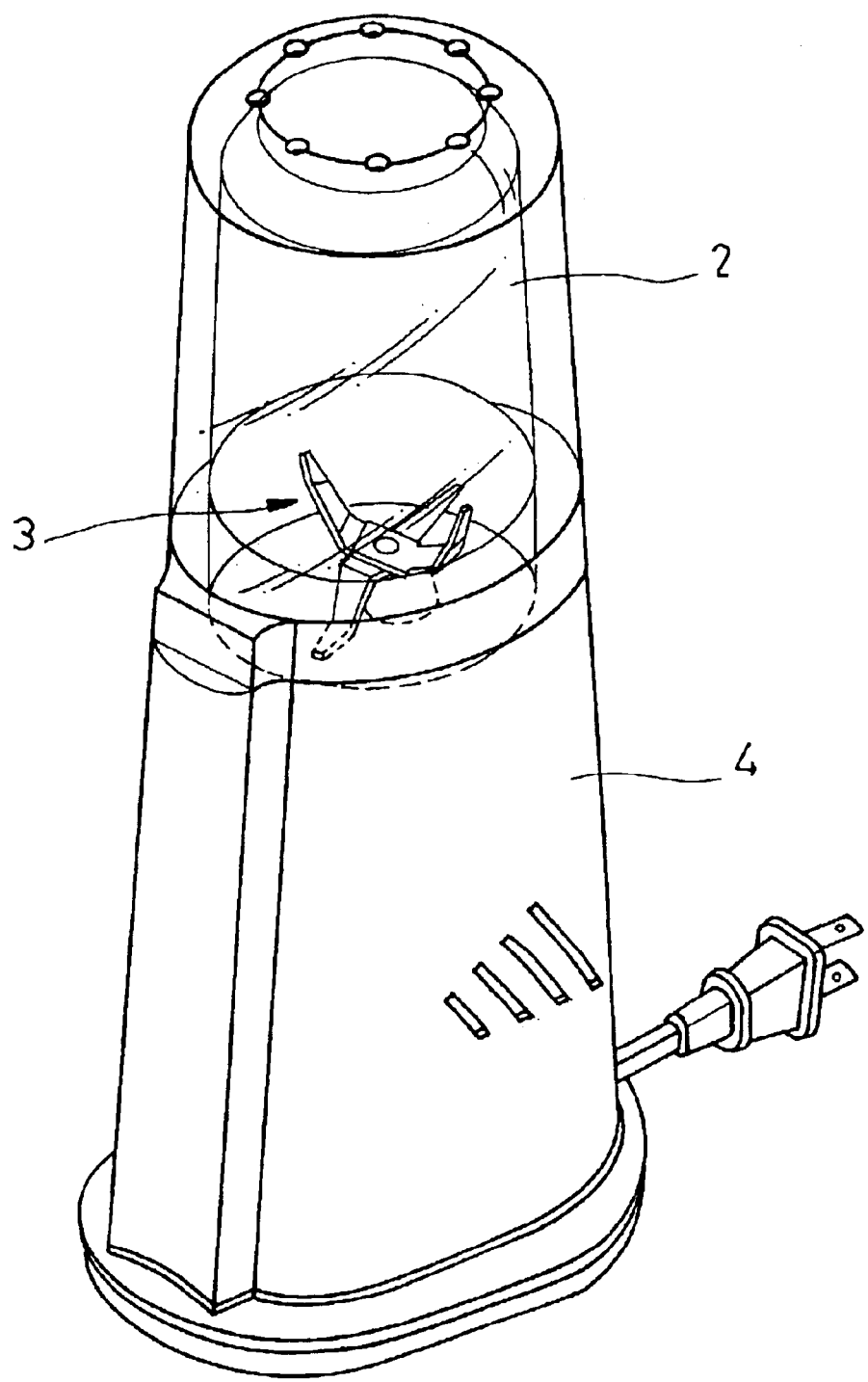
FIG. 2 is a perspective view of a food processor having a blade unit in the present invention.
Figure 3:
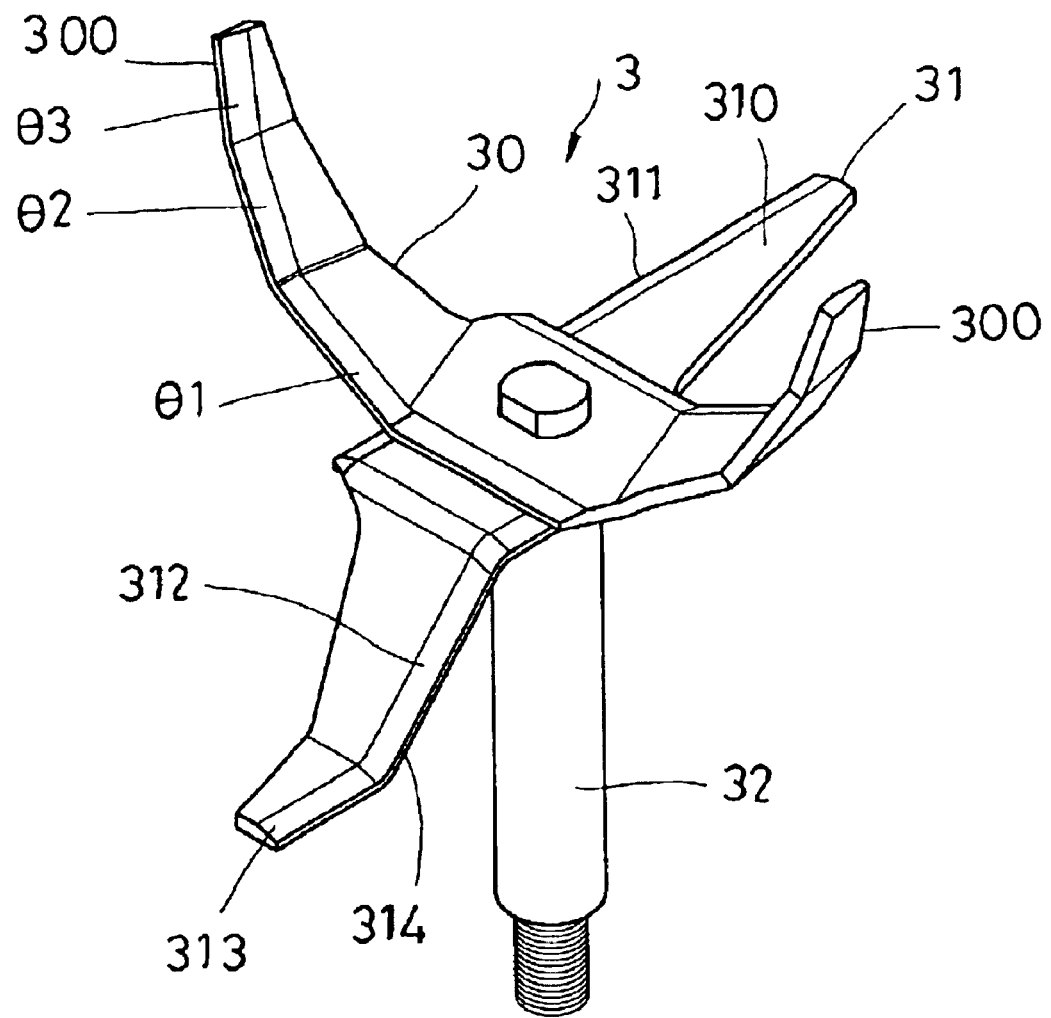
FIG. 3 is a perspective view of the food processor blade unit in the present invention.
Figure 4:
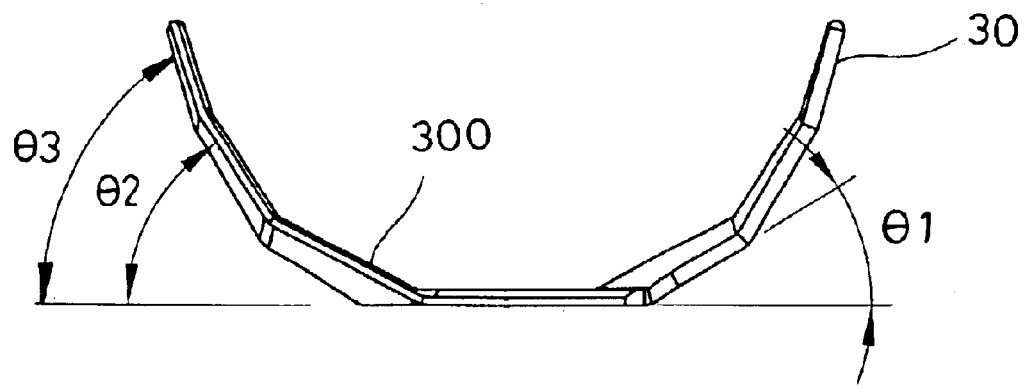
FIG. 4 is a side view of an upper blade in the present invention.
Figure 5:
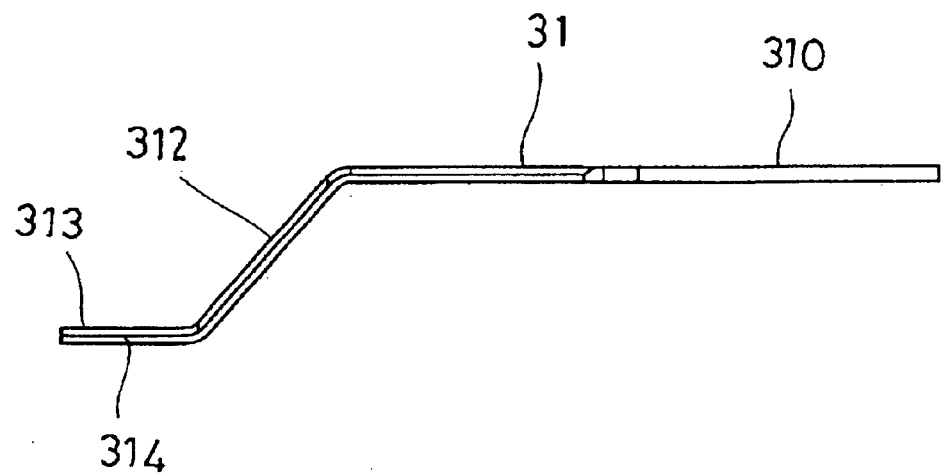
FIG. 5 is a side view of a lower blade in the present invention.

A preferred embodiment of a food processor blade unit in the present invention, as shown in FIGS. 2–5, includes a blade unit 3 fixed on a bottom upper surface of a hollow container 2 of a food processor. The hollow container 2 is supported on a base 4.

The blade unit 3 consists of an upper blade 30 and a lower blade 31 and a shaft 32 for rotating. The shaft 4 is combined with the center portions of the upper and the lower blade 30 and 31, and then has its lower end threadably connected with the base 4. The upper blade 30 is shaped nearly semi-circular, having two side sections separated by a center section and respectively divided into three stages, and an cutting edge 300 formed to cut in a counterclockwise rotation. The three stages of the upper blade 30 are a first stage $\theta 1$ bending 30 degrees, a second stage $\theta 2$ bending 60 degrees, and a third stage $\theta 3$ bending 72 degrees. The lower blade 31 has one side section formed as a level section 310 with a cutting edge 311 to cut in a counterclockwise rotation, and the other side section formed as a sloped section 312 with a bending down end section 313. The sloped section 312 and the bending-down end section 313 have a cutting edge 314 to cut in a counterclockwise rotation.

Figure 6:
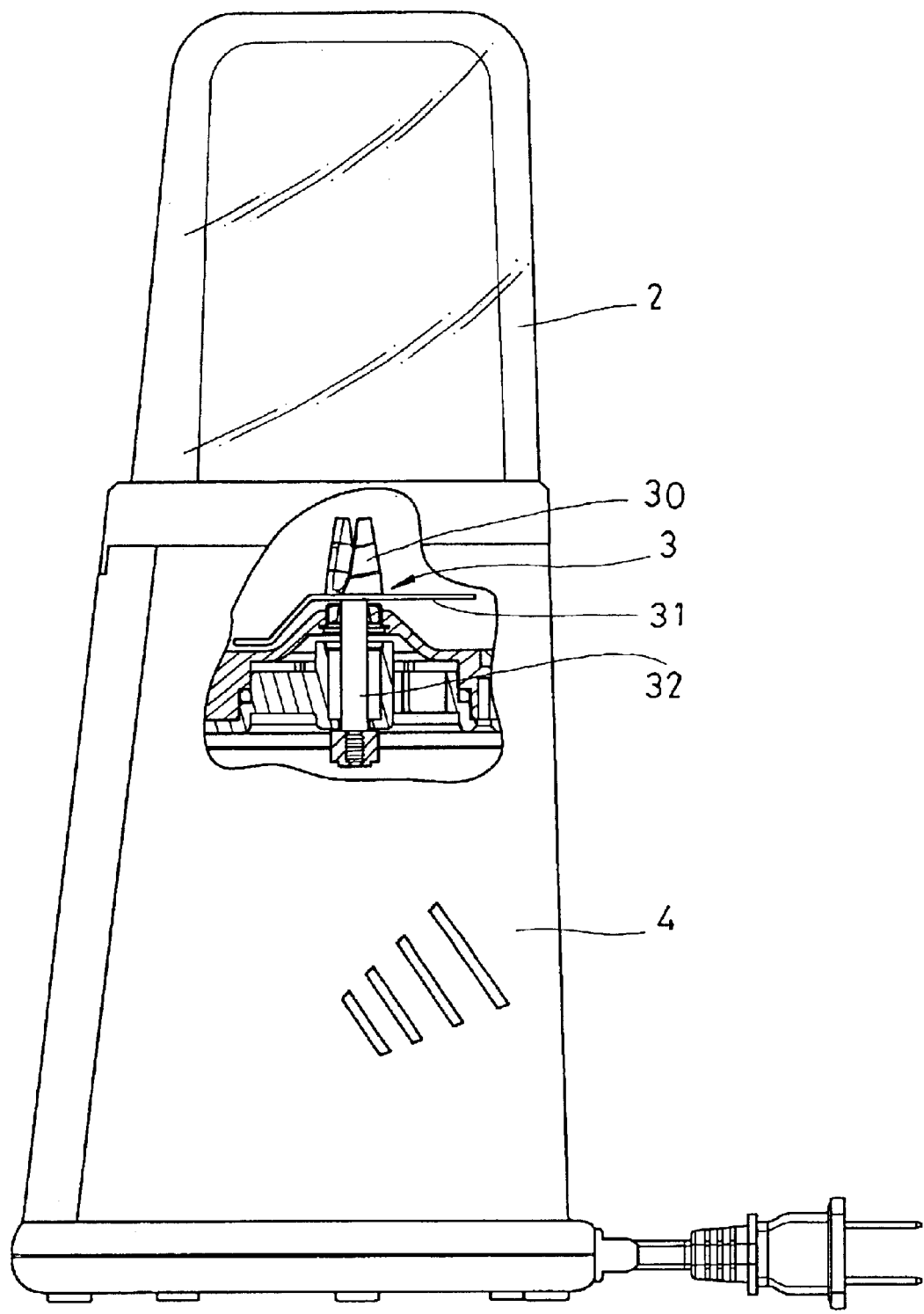
FIG. 6 is a partial cross-sectional view of the blade unit combined with a food processor.

In using, as shown in FIGS. 2–6, food is put into the container 2, and the rotating member arranged in the base 4 is started to rotate the blade unit 3, Then the first stage $\theta 1$, the second stage $\theta 2$ and the third stage $\theta 3$ of the upper blade 30 may cut food (specially hard nuts and the like) into minute pieces, and the level section 311 and the sloped section 312 with the bending-down section 313 may cut, stir and churn the cut food again and again repeatedly so that the food may become juice or minute bits or powder.

As can be understood from the foresaid description, the invention has the following advantages.

1. It uses the upper and the lower blade with various angled stages and the level and the sloped sections for swiftly cutting, stirring and churning food into juice, minutes bits or power, leaving little residue.
2. The second stage $\theta 2$, and the third stage $\theta 3$ can cut hard nuts into minute bits, and the level section 310 of the lower blade 31 can stir and churn the cut food, with the slopped section 312 and the bending-down end section 313 stir and churn the cut food sufficiently again and again so the nuts may become minutes bits or powder for benefits of further cooking or direct eating.

While the preferred embodiment of the invention has been described above, it will be recognized and understood that various modifications may be made therein and the appended claims are intended to cover all such modifications that may fall within the spirit and scope of the invention.

What is claimed is:

1. A food processor blade unit fixed on a bottom upper surface of a container of a food processor, said blade unit comprising an upper blade, a lower blade and a shaft fixed with a center section of said upper and said lower blade and threadably connected with a base containing a rotating member of said food processor and supporting said container;

characterized by said upper blade having two side sections separated by a center section and respectively divided into three stages, a first stage, a second stage and a third stage orderly, and said lower blade having two side sections to become a level section and a sloped section with a bending-down end section; and, said first stage, said second stage and said third stage of said upper blade having different angles from one another for cutting food, said sloped section and said bending-down end section of said lower blade cutting, stirring and churning at the same time already cut food so that the food such as vegetables or fruits may become juice, and food such as hard nuts, coffee beans may become minute bits or powder.

2. The food processor blade unit as claimed in claim 1, wherein said upper blade has a cutting edge formed at one lengthwise side, said first stage is angled for 30 degrees, said second stage is angled for 60 degrees and the third stage is angled for 72 degrees.

3. The food processor blade unit as claimed in claim 1, wherein said lower blade has a cutting edge formed in one lengthwise side of said level section, and the sloped section with said bending-down end section has a cutting edge in one lengthwise side.

* * * * *